US009992060B2

(12) United States Patent
Ponnuswamy

(10) Patent No.: US 9,992,060 B2
(45) Date of Patent: Jun. 5, 2018

(54) METHOD AND SYSTEM FOR DETERMINING A NETWORK CONFIGURATION FOR A DEPLOYMENT ENVIRONMENT

(71) Applicant: KodaCloud Inc., Campbell, CA (US)

(72) Inventor: Subbu Ponnuswamy, Saratoga, CA (US)

(73) Assignee: KodaCloud Inc., Campbell, CA (US)

( * ) Notice: Subject to any disclaimer, the term of this patent is extended or adjusted under 35 U.S.C. 154(b) by 209 days.

(21) Appl. No.: 14/700,471

(22) Filed: Apr. 30, 2015

(65) Prior Publication Data

US 2016/0323140 A1 Nov. 3, 2016

(51) Int. Cl.
*H04L 12/24* (2006.01)

(52) U.S. Cl.
CPC ...... *H04L 41/0803* (2013.01); *H04L 41/0813* (2013.01)

(58) Field of Classification Search
CPC ..... H04W 84/12; H04W 88/08; H04W 36/30; H04W 92/02; H04L 41/0803; H04L 41/0866
USPC ........................................................ 709/220
See application file for complete search history.

(56) References Cited

U.S. PATENT DOCUMENTS

| | | | |
|---|---|---|---|
| 7,055,107 B1 * | 5/2006 | Rappaport ............ | H04L 41/145 703/1 |
| 7,295,960 B2 * | 11/2007 | Rappaport ............ | G06F 17/509 455/403 |
| 2003/0050048 A1 * | 3/2003 | Abed ...................... | H04L 41/12 455/414.1 |
| 2005/0044196 A1 * | 2/2005 | Pullen ................. | H04L 41/0886 709/223 |
| 2005/0265321 A1 * | 12/2005 | Rappaport ............ | H04L 41/145 370/352 |
| 2010/0150027 A1 * | 6/2010 | Atwal ................... | H04W 16/18 370/254 |
| 2010/0198730 A1 * | 8/2010 | Ahmed ............. | G06F 17/30528 705/50 |
| 2011/0141913 A1 * | 6/2011 | Clemens ............. | H04L 41/0681 370/242 |
| 2011/0166952 A1 * | 7/2011 | Manchikanti .......... | G06Q 10/06 705/26.4 |
| 2012/0110156 A1 * | 5/2012 | Guru ..................... | H04L 67/125 709/223 |
| 2015/0230109 A1 * | 8/2015 | Socaciu ................ | H04W 64/00 455/418 |

* cited by examiner

*Primary Examiner* — Ruolei Zong
(74) *Attorney, Agent, or Firm* — Invoke

(57) ABSTRACT

Operations include determining a network configuration for a current deployment environment based on network configurations of known deployment environments that share one or more characteristics with the current deployment environment.

20 Claims, 4 Drawing Sheets

METHOD AND SYSTEM FOR DETERMINING A NETWORK CONFIGURATION FOR A DEPLOYMENT ENVIRONMENT

TECHNICAL FIELD

The present disclosure relates to determining a network configuration for a particular deployment environment. In particular, the present disclosure relates to determining a network configuration for the particular deployment environment based on network configurations selected for a plurality of known deployment environments.

BACKGROUND

In recent years, Wireless Local Area Network (WLAN) technologies have emerged as a fast-growing market. Among the various WLAN technologies, Institute of Electrical and Electronics Engineers (IEEE) 802.11 standard is the dominating technology and is frequently used for WLANs.

A challenge to provide WLAN access that meets a desired performance criteria and/or a cost criteria is the identification of a suitable set of network components (for example, access points) for installation within any deployment environment.

A set of network components suitable for one deployment environment may not necessarily be suitable for another deployment environment due to differences in the characteristics of the deployment environments.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features/components described in one embodiment may be combined with features/components described in a different embodiment. In some examples, well-known structures and devices are described with reference to a block diagram form in order to avoid unnecessarily obscuring the present invention.

General Overview

In an embodiment, a network configuration is determined for a current deployment environment. The current deployment environment is a deployment environment that is being configured (includes deployment environments being re-configured) with network components.

Determining the network configuration may include, but is not limited to, one or more of the following operations. The characteristics and/or the performance requirements of the current environment are identified. The characteristics of the current environment are compared to characteristics of a set of known deployment environments to identify a subset of the known deployment environments that share one or more characteristics with the current environment. The network configurations of the subset of known deployment environments are then selected for configuring the current deployment environment.

In an embodiment, the network configurations of the subset of known deployment environments may be scaled (or otherwise modified) to account for one or more differences in characteristics between the known deployment environments and the current deployment environment. The network configurations of the subset of known deployment environments may be scaled (or otherwise modified) based on a difference between the actual performance of the known deployment environments and the required performance of the current deployment environment.

A. Architectural Overview

One or more embodiments are related to a Deployment Environment (DE). A DE is referred to herein as a known DE or a current DE, both of which are further described below. One or more embodiments include a system that includes functionality to determine a configuration for a current DE.

Example System

Figure 1:
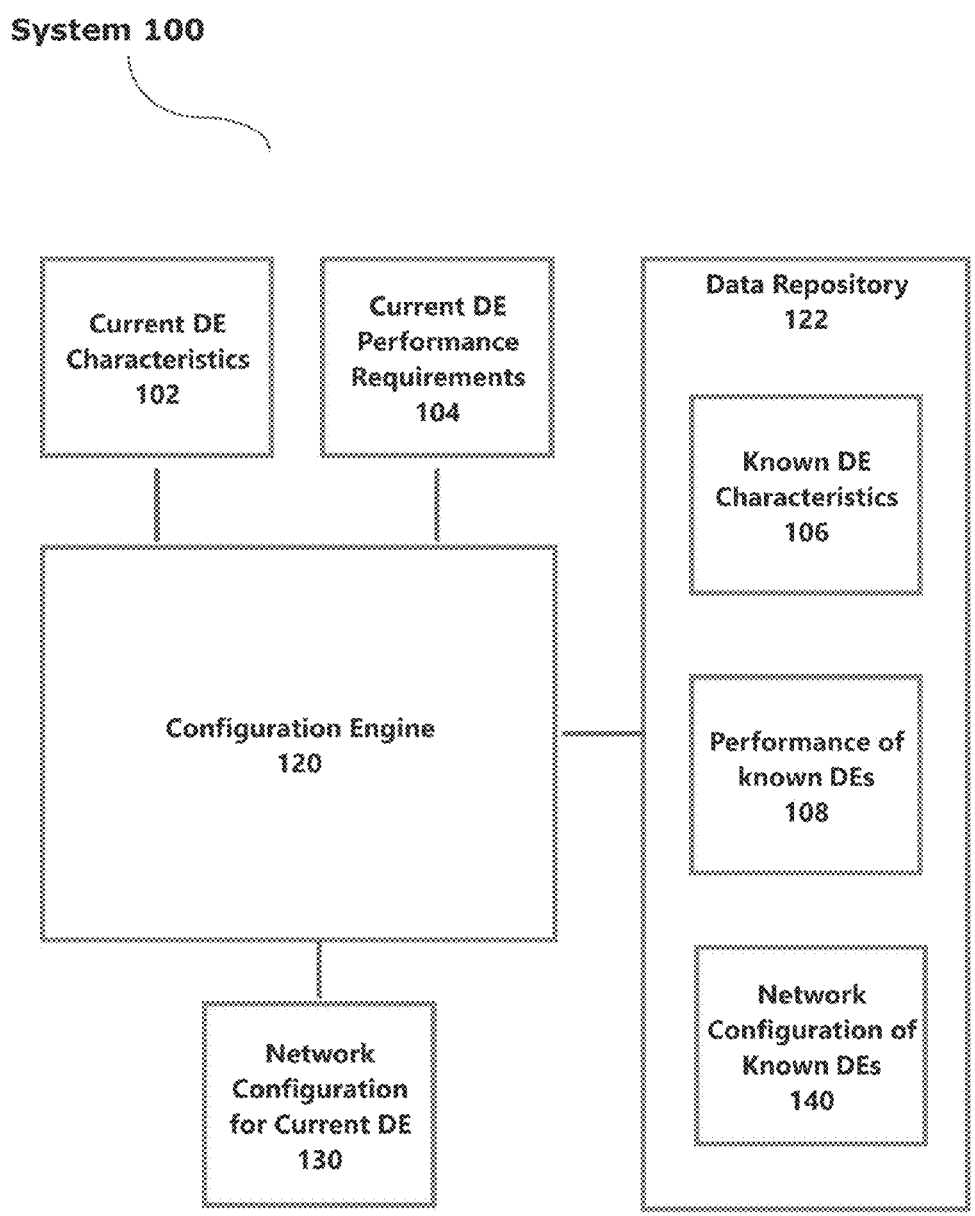
FIG. 1 shows a block diagram example of a system in accordance with one or more embodiments.

FIG. 1 illustrates an example of a system in accordance with one or more embodiments. As illustrated in FIG. 1, system 100 includes a configuration engine 120 and a data repository 122. In one or more embodiments, System 100 may include more or less components, than the components illustrated in FIG. 1. Operations described with respect to one component may instead be performed by another component.

Components and/or devices within System 100 are connected directly or via a network 124. In an embodiment, network 124 refers to a Local Area Network (LAN), a Wide Area Network (WAN), the Internet, or an Intranet. Devices connected by network 124 may or may not be illustrated in FIG. 1. In an embodiment, components within System (100) (for example, configuration engine 120 and data repository 122) are implemented on a same device.

Deployment Environment

In one or more embodiments, a Deployment Environment (DE) is a physical environment in which network components are deployed for providing network access. A DE may refer to in indoor space (e.g., an office, a hotel, or a home)

or an outdoor space (e.g., park or stadium). A DE may refer to an entire edifice or a portion of the edifice. For example, a DE may refer to a building with multiple offices, or a particular office or suite within the building. Portions of a DE may be referred to herein as "zones."

Known Deployment Environments

In an embodiment, a known DE corresponds to a DE in which network components have been deployed for providing network access to one or more client devices. A known DE includes deployments that are still in place or have since been removed.

A known DE may refer to an actual deployment at a customer site. Additionally or alternatively, a known DE may correspond to a test environment in which the network components are installed for the specific purpose of testing or monitoring network performance. Information (network components and/or performance) for the known DE is recorded. Thereafter, the known DE may be restructured, for example, by moving walls and/or objects within the known DE. The network configuration for the known DE may be modified to another network configuration to be used and/or tested. Characteristics of a DE, as described below, may be applicable to a known DE.

Current Deployment Environment

In an embodiment, a current DE is an DE in which network components are to be deployed (includes re-deployed or re-configured), based on a network configuration, for providing network access to one or more client devices. One or more operations described herein are related to determining the network configuration for the current DE. Characteristics of a DE, as described below, may be applicable to a current DE.

Characteristics of a Deployment Environment (DE)

A DE is defined by a set of DE characteristics applicable to the DE as a whole or applicable to one or more zones (portions) of the DE. Examples herein which refer to a DE as a whole may be equally applicable to a zone within a DE and examples herein which refer to a zone within a DE may be equally applicable to a DE as a whole. Known DE characteristics (106) and current DE characteristics (102) correspond to characteristics of known DEs and current DEs, respectively.

In an embodiment, DE characteristics include structural characteristics. Examples of structural DE characteristics include materials for building the DE such as glass, wood, brick, concrete, cement composites, foam, plastics, and metals. Additional examples of DE characteristics include square footage, ceiling height, density of structural elements, thickness of walls, altitude, height of building, power supply restrictions, pillars, support beams, a location (e.g., a city or country) and installation restrictions. In one example, a DE characteristic is an installation restriction that indicates that access points may only be installed on ceilings, or only be installed on walls. In another example, an installation restriction indicates that access points may only be installed under tables. Another example includes a DE characteristic which identifies a zone (e.g., an executive's office) within which access points cannot be installed, however, wireless network access is required for devices within that zone (for example, by network devices installed in neighboring zones).

In an embodiment, DE characteristics include type-of-use characteristics related to the use of the environment. Type-of-use characteristics include characteristics of people and/or objects within the environment. Examples of type-of-use characteristics include a number of users, a density of users, a type of user (e.g., light or heavy network access), and a type of usage (e.g., video data, text data, high accuracy data transfer, and low latency data transfer). Type-of-use characteristics may include objects such as sofas, couches, and computing systems that may be moved around within a DE.

In one example, DE characteristics define devices within the DE. For example, DE characteristics may identify a microwave and a respective location of the microwave. The DE characteristics may further indicate a particular radio frequency band associated with the microwave such that operation of the microwave on the particular radio frequency band interferes with wireless communication on the particular radio frequency band.

In an embodiment, DE characteristics are time-dependent. For example, DE characteristics define a number of users based on a time value. A number of users on weekdays between 8 am to 5 pm is different than a number of users on weekdays after 5 pm or during the weekend. Accordingly, DE characteristics may be associated with a respective time period during which the DE characteristics are applicable.

DE characteristics may explicitly or implicitly define elements of the DE. For example, DE characteristics may explicitly identify the material of a two story office building as wood. In another example, DE characteristics indicate a country (e.g, United States) and year (e.g., 1955) of build which implies building materials. Homes in the United States in the 1950s, for example, were often constructed with a raised foundation including a perimeter foundation of concrete with wood beams and joists supported by wood posts. The concrete did not extend up from the base. Accordingly, a DE characteristic identifying a home as an American home built in 1955 is indicative of the walls including wood beams but not concrete. Other examples include determining characteristics of commercial buildings, high-rises, business parks, etc. based on descriptions/information.

In an embodiment, DE characteristics are specified as a map or floorplan of a building. A floorplan of a building includes architectural design elements which correspond to various DE characteristics. The system may be configured to parse through the floorplan to identify specific characteristics of the current DE. Furthermore, the system may be configured to use descriptive information and/or a learning database to define characteristics for constructing a profile of the current DE.

Configuration Engine

In an embodiment, configuration engine 120 includes one or more digital devices configured to perform operations described herein for determining a network configuration for a current DE ("current DE configuration 130"). The term "digital device" generally refers to any hardware device that includes a processor. When the digital device is adapted for communications with a network (for example, network 124), the digital device may be configured as a network device, a client device, or both. A digital device may refer to a physical controller device or a hardware device executing a virtual machine (e.g., a virtual controller).

Examples of digital devices include a computer, a tablet, a laptop, a desktop, a netbook, a server, a web server, a network policy server, a mainframe, a television, a content receiver, a set-top box, a video gaming console, a printer, a mobile handset, a smartphone, a personal digital assistant "PDA", a wireless receiver and/or transmitter, an access point, a base station, a communication management device, a router, a switch, and/or a controller.

Data Repository

In one or more embodiments, the data repository 122 is any type of storage unit and/or device (e.g., a file system, database, collection of tables, or any other storage mechanism) for storing data. Further, the data repository 122 may include multiple different storage units and/or devices. The multiple different storage units and/or devices may or may not be of the same type or located at the same physical site. Further, the data repository may be or may execute on the same computing system as configuration engine 120. Alternatively or additionally, the data repository 122 may be on a separate computing system than the configuration engine 120. The data repository 122 may be connected to the configuration engine 120 via a direct connection or via a network (for example, network 124).

In an embodiment, data repository 122 includes characteristics of known Deployment Environments (referred to herein as "known DE characteristics 106"), actual performance of the known deployment environments (referred to herein as "known DE performance 108"), and configurations of the known deployment environments (referred to herein as "known DE configurations 110").

Client Devices

In an embodiment, system 100 includes client devices (not shown). The client devices are digital devices that include a processor, memory, and input/output (I/O) interfaces including a wireless interface such as an IEEE 802.11 wireless interface. The wireless interface may be used to communicate with network components to obtain access to devices and/or resources within System 100. The client devices may be wireless electronic devices that are capable of receiving voice data streams, video data streams, or any other type of data. Examples of client devices include personal computers, laptop computers, netbook computers, wireless music players, portable telephone communications devices, smart phones, tablets, and digital televisions.

Performance of a Deployment Environment

In an embodiment, a performance of a known DE 108 refers to the performance of components (e.g., network components or client devices) in a known DE. In an embodiment, performance requirements of a current DE define the requirements that must be met by a network configuration determined for the current DE.

Examples of performance measurements and/or performance requirements include throughput per user, latency for requests, time for client handoffs, time for authentication, error tolerance, downtime, a number of errors, coverage level, link quality, and a number of concurrently supported users with minimum performance levels.

Network Configuration for a Deployment Environment

A network configuration (e.g., known DE configuration 110 or current DE configuration 130) includes configuration of network components within a DE. A known DE configuration 110 is a network configuration that was configured for a known DE. The known DE configuration 110 may still be in use for the known DE or may no longer be in use for the known DE. A current DE configuration 130 is a network configuration to be deployed at a current DE.

In one example, network components include devices which may be connected to by client devices via wireless or wired mediums for accessing a network. Network components include devices for accessing a network via Wi-Fi connection, Bluetooth connection, Near Field Communication (NFC), or via any other currently known or later developed communication protocols. Network components may additionally include devices for supporting, managing, or configuring the devices which may be connected to for accessing a network.

In one example, network components correspond to access points located or to-be-located within a deployment environment. The access points may be managed remotely by a third party service. An administrator and/or a computer system associated with the third party configures the access points (for example, the Radio Frequency parameters) based on current DE configuration 110 by transmitting commands over the internet to the access points. The remote management of the access points may be referred to as cloud based management of the access points.

In an embodiment, a network configuration specifies any information related to network components. In one example, a network configuration specifies a number and/or a type of network components. Specifically, the network configuration specifies the model numbers of access points to be installed in the DE.

In an embodiment, the network configuration specifies parameters of network components including software configurations of the network components and/or hardware configurations of the network components. In an example, the network configuration specifies the direction/orientation of an antenna of an access point that is to be mounted on a ceiling. In another example, the network configuration specifies a Radio Frequency channel or set of channels that may be used by an access point. In an example, the network configuration specifies a transmit power $T_x$ to be used by a network device for the wireless transmission of packets and/or a receive sensitivity $R_x$ to be used by the network device to detect wireless signals.

In an embodiment, the network configuration specifies installation details such as where a network device is to be installed (e.g., ceiling, wall, or under a table), orientation of network devices to be installed, spacing of network devices to be installed, and/or an exact location of network devices to be installed. The network configuration may specify installation of network devices in relation to other devices (e.g., access points must be installed at least 5 feet away from a microwave). The network configuration may specify a network component density (for example, x number of access points for every 100 feet of space.

B. Determining a Network Configuration for a Current Deployment Environment

Figure 2:
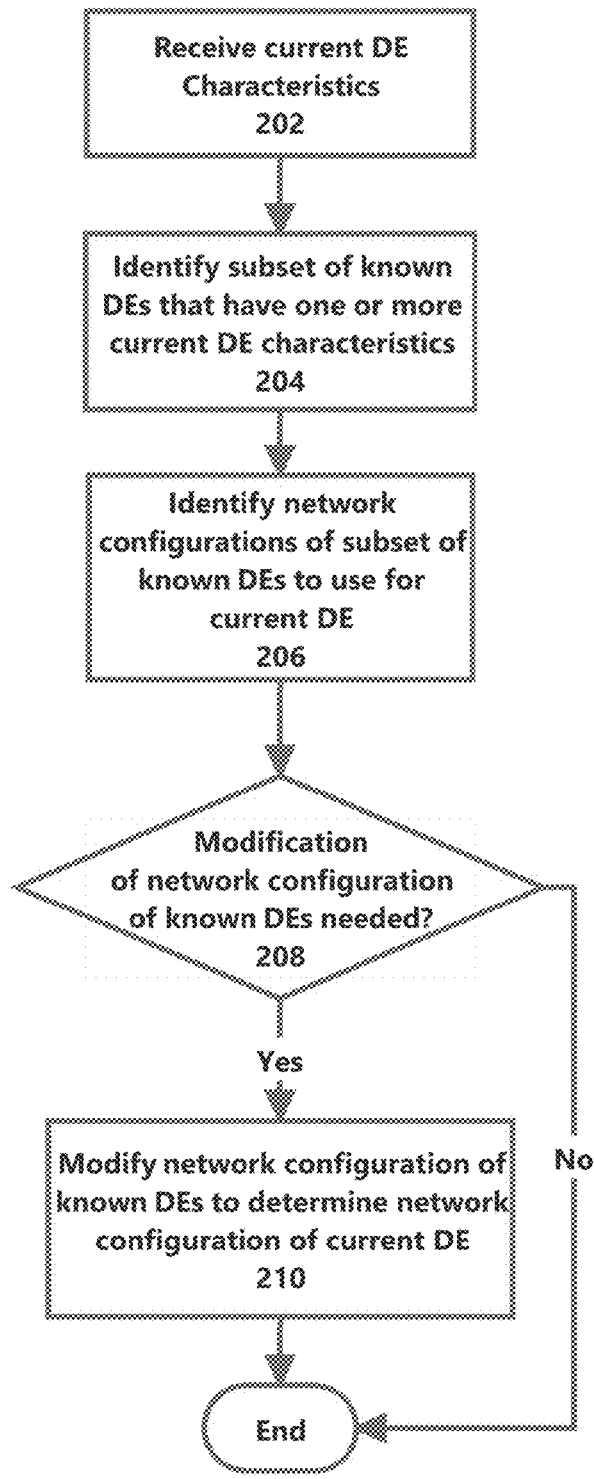
FIG. 2 shows an example set of operations for determining a network configuration in accordance with one or more embodiments.

In an embodiment, a network configuration is determined for a current Deployment Environment (DE) based on current DE characteristics, current DE performance requirements, known DE characteristics, known DE performance, and/or known DE configurations. FIG. 2 illustrates an example set of operations for determining a network configuration for a current DE. One or more operations illustrated in FIG. 2 may be modified, rearranged, or omitted all together. Accordingly, the particular sequence of operations illustrated in FIG. 2 should not be construed as limiting the scope of one or more embodiments.

Initially, a set of current DE characteristics is received for a current DE for which a network configuration is to be generated (Operation 202). In one example, the set of current DE characteristics is received via a user interface which allows a user to specify the current DE characteristics. The interface may allow the user to select attributes using checkboxes (e.g., checkboxes indicating construction materials), radio buttons (e.g., to specify a number of floors), or text fields (e.g., to describe restrictions on where access points can be installed). The interface may be configured to allow a user to upload a floorplan of the current DE. The system receives the floorplan and compares the floorplan to a database of known architectural elements to identify components within the floorplan such as doors, windows, and walls. The system further presents an editable version of the floorplan, so that the user can add, remove, or modify elements within the floorplan. In one example, the user is able to specify the location of a microwave on the architectural floorplan.

In an embodiment, current DE characteristics are obtained by monitoring the DE. In an example, a previously used network configuration for the current DE included monitoring devices which monitored client devices within the DE to determine a type, number, and/or usage of client devices within the DE. The information gathered by monitoring the DE may be used to determine the type-of-use characteristics (described in detail above) associated with the DE.

In an embodiment, the current DE characteristics are obtained by a questionnaire presented to a user. Specifically, the user is presented with and navigated through a set of questions about the characteristics of the DE. The user's responses are recorded as current DE characteristics.

In an embodiment, the current DE characteristics are searched based on an initial set of information about the DE. For example, initial information received for a current DE includes an address. The address is queried against a database of city zoning information including granted licenses, structural requirements, and permissions granted by the city. Furthermore, the address may be queried against a database of inspection records that identify the structural elements used for creating the DE (e.g., building materials, square footage, etc.). The query results in additional information about the DE that may be used as current DE characteristics. In another example, the DE characteristics for an office on a twentieth floor of a high rise building are determined (or assumed) based on the DE characteristics of an office on the twenty-first floor of the same high rise building.

In an embodiment, the current DE characteristics (received in Operation 202) are compared to the characteristics of known DEs to identify a subset of known DEs that share one or more characteristics with the current DE (Operation 204). The subset of known DEs that share at least some characteristics with the current DE are likely to have similar Wi-Fi network coverage/performance when similar network configurations are used. This subset of known DEs may be similar to the current DE for propagation of wireless signals transmitted by network components and/or client devices.

The comparison of the characteristics to identify the subset of known DEs may include comparison of required elements and/or preferred elements. Required elements are elements of the current DE which are required in a known DE to determine that the known DE is similar to the current DE. A known DE is included in the selected subset of known DEs only if the known DE has the required elements. Preferred elements are elements of the current DE which when included in a known DE are indicative of the known DE being similar to the current DE. However, a known DE may be included in the selected subset of known DE even if the known DE does not have all of the preferred elements associated with a current DE.

In one example, a characteristic of a current DE identifies metal walls or concrete walls. Metal and concrete both have a very high interference potential for Wi-Fi signals. Accordingly, in order to identify subsets of known DEs that are similar to the current DE, metal walls or concrete walls are used as requirements. Known DEs with wood frames and sheet rock are not included within the subset of known DEs because wood frames with sheet rock cause very little Wi-Fi interface resulting in very different wireless coverage than the current DE if similar network configurations were implemented.

In one example, characteristics of a current DE may be used to identify the subset of known DEs based on similar materials with regard to/effect on propagation of wireless signals. In an example, thin glass has very little effect on the transmission of wireless signals. A current DE with a large interior space separated by thin glass panels is considered similar to a known DE with a similar large interior space without any glass panels because thin glass panels have very little effect on wireless signals. In contrast, bulletproof glass has a very high interference effect on wireless signals. If the current DE has bulletproof glass panels separating a large interior space, known DEs without the bulletproof glass are not included in the subset of known DEs similar to the current DE. In another example, metal barriers and concrete barriers are used interchangeably in identifying known DEs that are similar to a current DE because metal barriers and concrete barriers have a similar effect on wireless signals as bulletproof glass.

In an embodiment, a network configuration is identified for each known DE that is selected in the subset of known DEs sharing one or more characteristics with the current DE (Operation 206). Determining the network configuration for a known DE may refer to determining a network configuration for a particular zone of the known DE that had characteristics in common with a zone (or multiple zones or all zones) of the current DE.

Determining the network configuration for a known DE may include executing a query using an identifier for the known DE. The query may return information describing the network configuration for the known DE.

In an embodiment, the query may be executed on a zone-by-zone basis. For example, characteristics of a current DE (or a zone of the current DE) are submitted in a query. The query is executed to both (a) identify the known DE zones that have similar characteristics to the submitted characteristics and (b) identify the network configurations associated with the known DE zones identified in operation (a).

In an embodiment, identifying the network configuration may include a filtering or modifying step based on the requirements of the current DE. For example, a network configuration for a particular known DE may identify a plurality of network components deployed for the particular known DE and a respective installation configuration for installation on the ceiling of the particular known DE. The characteristics of the current DE include a restriction stating that all network components are to be installed under tables for aesthetic purposes. Based on the restriction, the network configuration is modified for deploying each of the network components in the current DE. Modifying the network configuration includes ensuring that performance requirements are met. If the network components installed under the table are determined to provide an insufficient level of performance, additional network components are added to the network configuration. A notification is included that indicates the addition of the network components and the corresponding increase in price. In other examples, network components may be filtered and/or substituted for any other characteristics (for example, power requirements, space/size requirements, etc.) associated with the current DE.

In an embodiment, the network configuration for one or more known DEs is modified to determine the network configuration for the current DE (Operation 210) if modification is necessary based on differences between the known DE(s) and the current DE (Operation 208).

In one example, a known DE has the same construction materials as the current DE, which are likely to have similar effects on the propagation of wireless signals. Accordingly, each network component selected for the known DE may perform similarly when deployed in the current DE. However, in this example, the current DE is twice as big as the known DE. In order to account for the difference in size between the known DE and the current DE, the network components in the network configuration of the known DE are doubled to determine a network configuration for the current DE. As is understood by persons known in the art, certain network components in the network configuration of the known DE may not be doubled. For example, the known DE may include a controller with functionality to manage 100 access points even though the known DE only had 50 access points. In this example, 100 access points are determined in the network configuration for the current DE. A further determination is made that a single controller (as deployed in the known DE configuration) is sufficient to support the 100 access points in the network configuration for the current DE. Accordingly, the network configuration for the current DE is determined to include a single controller.

In an embodiment, the network configuration for known DEs is modified based on a difference between the actual performance of the known DEs and the required performance of the current DEs. In an example, the current DE corresponds to a first customer with a premier membership requiring a highest performance level available (for example, X Gigabit throughput per second per client device). A known DE corresponds to a second customer with a standard membership requiring a basic performance level (for example, X/2 Gigabit throughput per second per client device). The network configuration for the known DE is configured to provide the basic performance level to the client devices within the known DE which would be insufficient for the client devices within the current DE. Based on a relationship between the performance levels, the network configuration for the known DE is upgraded to determine the network configuration for the current DE. The upgraded network configuration for the current DE (that is determined via an upgrade function applied to the network configuration of the known DE) results in the highest performance level for the devices within the current DE.

In an embodiment, the network configurations determined for respective zones of the current DE are aggregated to obtain a network configuration for the current DE as a whole (operation not shown in flow chart). The network configuration for the current DE as a whole may then be modified and adapted.

In one example, two zones defined in the current DE have a thin glass separating the zones. As a result, network components to be installed at the edge of one zone may be sufficient to provide network access to client devices located in the neighboring zone. Accordingly, the network components in the neighboring zone may be removed from the network configuration for the current DE as a whole.

In another example, the network configuration determined for the current DE as a whole may be evaluated to ensure that all zones within the current DE would have sufficient network coverage. Any holes in the network coverage are identified and additional network components are added to eliminate the holes in the network coverage.

In an embodiment, the network configuration for one or more known DEs is modified to determine the network configuration for the current DE based on user input. In an example, an intermediary network configuration is determined based on the network configuration for the one or more known DEs. The intermediary configuration is presented to a user who submits user input indicating changes to the intermediary configuration. The changes may include, but are not limited to, the addition, removal, and/or substitution of network components, the modification of installation configurations for the network components, the specification of restrictions for the current DE (e.g., defining areas where network components may not be installed). In this example, the user submits user input to move network components away from restrooms and elevators. Furthermore, the user specifies locations where there is no power supply or Ethernet connection and where no network components may be installed. The user may move a location for installing a network component as indicated in the intermediary network configuration to a new location where the user knows that a power supply or Ethernet connection is available. In another example, a user specifies a portion of the current DE where no network access is to be provided (e.g., because the user does not occupy that portion of the current DE or no coverage is desired for that portion).

Once determined, the network configuration for the current DE may be displayed, presented, stored, and/or implemented. A user may further modify the network configuration determined by the system.

C. Example Embodiment

Figure 3:
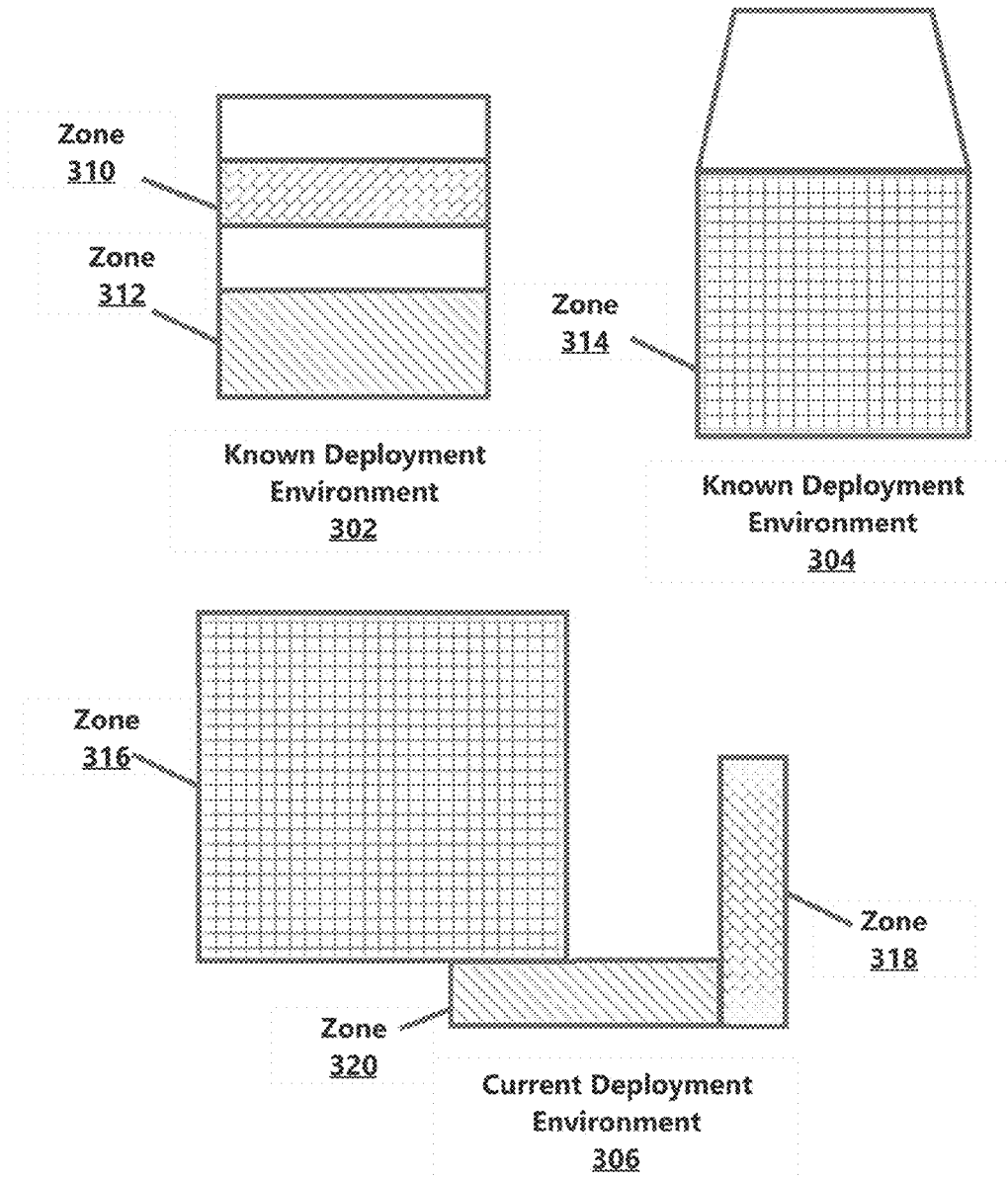
FIG. 3 illustrates one example of selection of zones in known DEs which are used for configuring a current DE in accordance with one or more embodiments.

FIG. 3 visually illustrates one example of selection of zones in known DEs which are used for configuring zones of a current DE. Specifically, network configurations of the zones in known DEs are used to determine network configurations of similar zones in the current DE. This example should not be construed as limiting the scope of any of the embodiments in any regard. This is a simple example described only for the purpose of explanation. Features, components, and/or operations described with regard to this example embodiment are not necessarily applicable to other embodiments.

In this example embodiment, a network configuration is to be determined for a current deployment environment 306. The current deployment environment 306 includes zone 316, zone 318, and zone 320. A search is performed on a database of known deployment environments to identify zones that share one or more characteristics with any of zone 316, zone 318, and zone 320. Zone 310 of known deployment environment 302 is found to have a same square footage and shape as zone 318. Zone 312 of known deployment environment 302 is found to have a same density of users as zone 320. Zone 314 of known deployment environment 304 is found to have a same set of building materials as zone 316 of current deployment environment 306. Although this example lists a single similarity for purposes of clarity, typical implementations include a multi-level similarity analysis for selecting similar known DEs.

Based on the similar characteristics described above (and additional characteristics not described above), the network components used for configuration of zone 310 are used to configure zone 318 without any modification. The network components of zone 314 are scaled up to determine the network components of zone 316 to account for a difference in size between zone 314 and zone 316. Finally, the network components of zone 312 are scaled down and substituted for cheaper alternatives to determine network components for zone 320.

Once the network configurations for zone 316, zone 318, and zone 210 are determined, the network configuration for current deployment environment 306 is evaluated as a whole to determine if there are any holes in network coverage requiring additional network components or if there is any overlap such that some network components may be removed. After any necessary modifications, the network components determined for the current deployment environment 306 are presented as a network configuration generated by the system.

D. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

E. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
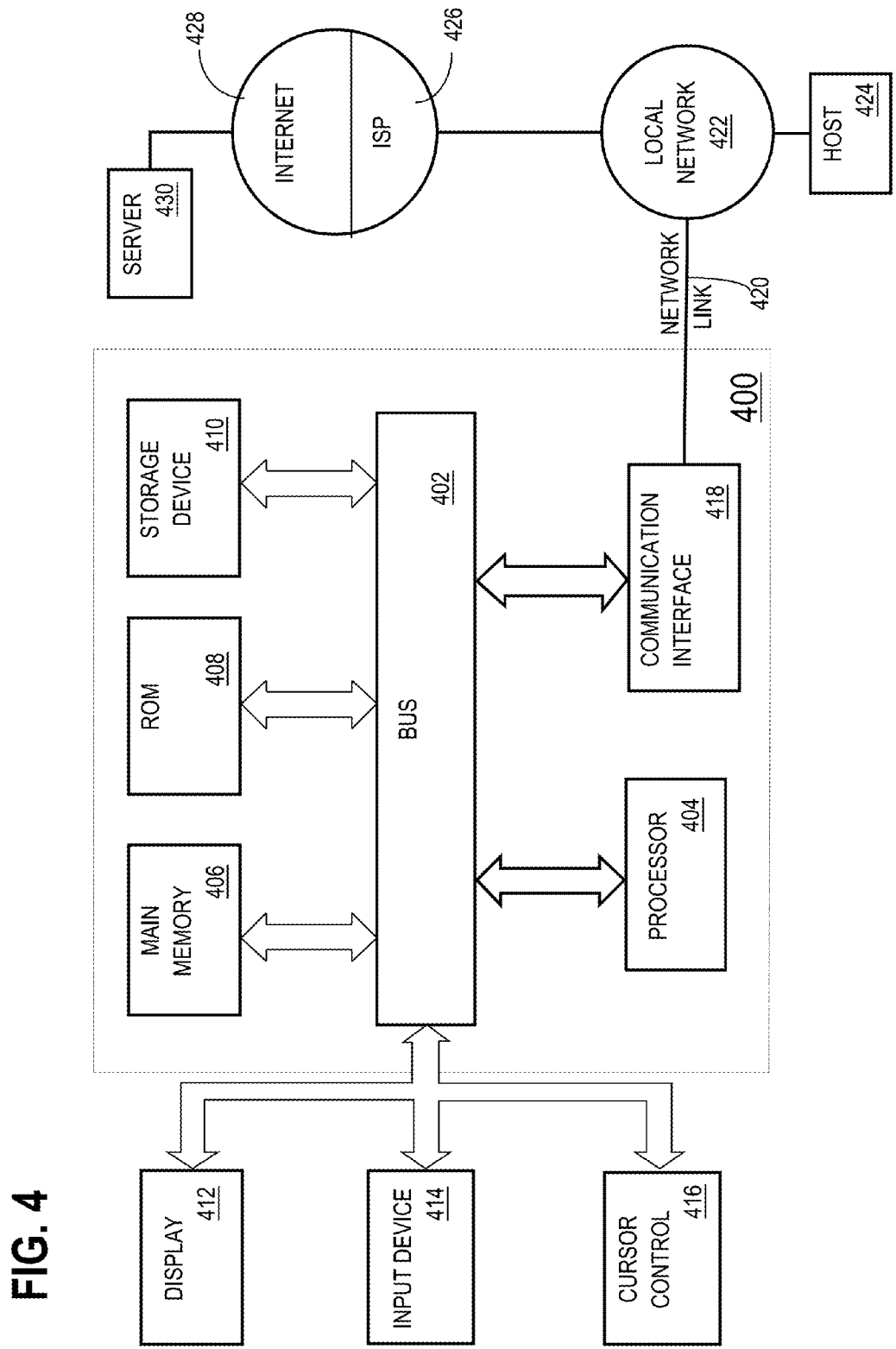
FIG. 4 a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions, which when executed by one or more hardware processors, causes performance of operations comprising:
   receiving physical characteristics of a current physical Deployment Environment (DE), wherein the current physical DE comprises at least one of a physical indoor space and a physical outdoor space;
   identifying a subset of one or more known physical DEs, from a plurality of known physical DEs, that are each associated with at least one of the physical characteristics of the current physical DE;
   identifying a set of one or more network configurations associated with each known physical DE in the subset of known physical DEs;
   based on the set of network configurations associated with each known physical DE in the subset of known physical DEs, determining a particular network configuration for the current physical DE,
   wherein determining the particular network configuration for the current physical DE comprises:
      determining one or more differences between the physical characteristics of the current physical DE and physical characteristics of a first known physical DE in the subset of known physical DEs, and
      based on the one or more differences between the physical characteristics, modifying a first network configuration associated with the first known physical DE to determine the particular network configuration for the current physical DE.

2. The medium of claim 1, wherein modifying the first network configuration comprises scaling a number of network components in the first network configuration based on a difference in size between the first known physical DE and the current physical DE.

3. The medium of claim 1, wherein modifying the first network configuration comprises substituting network components in the first network configuration based on a difference in network configuration budgets between the first known physical DE and the current physical DE.

4. The medium of claim 1, wherein determining the particular network configuration for the current physical DE further comprises:
   determining one or more differences between a performance requirement of the current physical DE and performance measurement of a first known physical DE in the subset of known physical DEs;
   wherein modifying the first network configuration associated with the first known physical DE to determine the particular network configuration for the current physical DE is further based on the one or more differences between the performance requirement of the current physical DE and the performance measurement of the first known physical DE.

5. The medium of claim 1, wherein determining the particular configuration for the current physical DE further comprises:

determining a network configuration for a first zone of the current physical DE based on a network configuration of the first known physical DE in the subset of known physical DEs.

6. The medium of claim 1, wherein determining the particular network configuration for the current physical DE further comprises:
  determining a first network configuration for a first zone of the current physical DE based on a network configuration of the first known physical DE in the subset of known physical DEs;
  determining a second network configuration for a second zone of the current physical DE based on the network configuration of a second known physical DE in the subset of known physical DEs;
  combining at least the first network configuration and the second network configuration to determine the particular network configuration for the current physical DE.

7. The medium of claim 1, wherein determining the particular network configuration further comprises:
  determining an intermediary network configuration based on the set of network configurations associated with each known physical DE in the subset of known physical DEs;
  modifying the intermediary network configuration to generate the particular network configuration for the current physical DE.

8. The medium of claim 7, wherein the intermediary network configuration is modified based on user input.

9. The medium of claim 1, wherein determining the particular network configuration further comprises:
  determining an intermediary network configuration based on the set of network configurations associated with each known physical DE in the subset of known physical DEs;
  evaluating the intermediary network configuration based on requirements associated with the current physical DE to identify one or more portions of the intermediary network configuration that does not meet the requirements;
  modifying the one or more portions of the intermediary network configuration to generate the particular network configuration for the current physical DE.

10. The medium of claim 1, wherein identifying the subset of one or more known physical DEs, from the plurality of known physical DEs, that are each associated with at least one of the physical characteristics of the current physical DE comprises:
  identifying a subset of one or more required physical characteristics of the current physical DE;
  selecting a qualified set of physical DEs from the plurality of known physical DEs that are associated with each of the required physical characteristics of the current physical DE;
  selecting the subset of physical DEs from the qualified set of known physical DEs.

11. The medium of claim 10, wherein selecting the subset of physical DEs from the qualified set of known physical DEs is based on an association of each of the subset of physical DEs with one or more preferred physical characteristics in the physical characteristics of the current physical DE.

12. A system comprising:
  at least one device including a hardware processor; and
  one or more non-transitory computer-readable media storing instructions, which when executed by the one or more hardware processors, cause execution of operations comprising:
    receiving physical characteristics of a current physical Deployment Environment (DE), wherein the current physical DE comprises at least one of a physical indoor space and a physical outdoor space;
    identifying a subset of one or more known physical DEs, from a plurality of known physical DEs, that are each associated with at least one of the physical characteristics of the current physical DE;
    identifying a set of one or more network configurations associated with each known physical DE in the subset of known physical DEs;
    based on the set of network configurations associated with each known physical DE in the subset of known physical DEs, determining a particular network configuration for the current physical DE,
  wherein determining the particular network configuration for the current physical DE comprises:
    determining one or more differences between the physical characteristics of the current physical DE and physical characteristics of a first known physical DE in the subset of known physical DEs, and
    based on the one or more differences between the physical characteristics, modifying a first network configuration associated with the first known physical DE to determine the particular network configuration for the current physical DE.

13. The system of claim 12, wherein modifying the first network configuration comprises scaling a number of network components in the first network configuration based on a difference in size between the first known physical DE and the current physical DE.

14. The system of claim 12, wherein modifying the first network configuration comprises substituting network components in the first network configuration based on a difference in network configuration budgets between the first known physical DE and the current physical DE.

15. The system of claim 12, wherein determining the particular configuration for the current physical DE further comprises:
  determining a network configuration for a first zone of the current physical DE based on a network configuration of the first known physical DE in the subset of know physical DEs.

16. The system of claim 12, wherein determining the particular network configuration for the current physical DE further comprises:
  determining a first network configuration for a first zone of the current physical DE based on a network configuration of the first known physical DE in the subset of known physical DEs;
  determining a second network configuration for a second zone of the current physical DE based on the network configuration of a second known physical DE in the subset of known physical DEs;
  combining at least the first network configuration and the second network configuration to determine the particular network configuration for the current physical DE.

17. The system of claim 12, wherein determining the particular network configuration further comprises:
  determining an intermediary network configuration based on the set of network configurations associated with each known physical DE in the subset of known physical DEs;

modifying the intermediary network configuration to generate the particular network configuration for the current physical DE.

18. The system of claim 12, wherein determining the particular network configuration further comprises:
   determining an intermediary network configuration based on the set of network configurations associated with each known physical DE in the subset of known physical DEs;
   evaluating the intermediary network configuration based on requirements associated with the current physical DE to identify one or more portions of the intermediary network configuration that does not meet the requirements;
   modifying the one or more portions of the intermediary network configuration to generate the particular network configuration for the current physical DE.

19. The system of claim 12, wherein identifying the subset of one or more known physical DEs, from the plurality of known physical DEs, that are each associated with at least one of the physical characteristics of the current physical DE comprises:
   identifying a subset of one or more required physical characteristics of the current physical DE;
   selecting a qualified set of physical DEs from the plurality of known physical DEs that are associated with each of the required physical characteristics of the current physical DE;
   selecting the subset of physical DEs from the qualified set of known physical DEs.

20. The system of claim 19, wherein selecting the subset of physical DEs from the qualified set of known physical DEs is based on an association of each of the subset of physical DEs with one or more preferred physical characteristics in the physical characteristics of the current physical DE.

* * * * *